United States Patent
Chien et al.

(10) Patent No.: US 8,244,060 B2
(45) Date of Patent: *Aug. 14, 2012

(54) NOISE SUPPRESSION METHOD FOR DIGITAL IMAGE

(75) Inventors: Chung-Fang Chien, Taipei (TW); Che-Hung Lin, Nantou County (TW)

(73) Assignee: Altek Corporation, Hsinchu (TW)

( * ) Notice: Subject to any disclaimer, the term of this patent is extended or adjusted under 35 U.S.C. 154(b) by 396 days.

This patent is subject to a terminal disclaimer.

(21) Appl. No.: 12/649,126

(22) Filed: Dec. 29, 2009

(65) Prior Publication Data

US 2011/0069886 A1 Mar. 24, 2011

(30) Foreign Application Priority Data

Sep. 18, 2009 (TW) ............................... 98131643 A

(51) Int. Cl.
 *G06K 9/40* (2006.01)
(52) U.S. Cl. ...................................................... 382/275
(58) Field of Classification Search .................. 382/260, 382/275, 282
See application file for complete search history.

(56) References Cited

U.S. PATENT DOCUMENTS 5,845,017 A * 12/1998 Keyes ........................... 382/261
6,907,144 B1 * 6/2005 Gindele ........................ 382/275

* cited by examiner

*Primary Examiner* — Phuoc Tran
(74) *Attorney, Agent, or Firm* — Morris, Manning & Martin, LLP; Tim Tingkang Xia, Esq.

(57) ABSTRACT

A noise suppression method for a digital image is described, which utilizes an adjacent area of a target pixel in the digital image to conduct a denoising process on the target pixel. The noise suppression method includes the following steps. A feature-weighted processing procedure is performed on each original pixel in the digital image to convert the original pixel into a feature-weighted pixel. According to a position of the target pixel in the digital image, a reference pixel is selected from a corresponding position in the feature-weighted image. Similarities of the reference pixel relative to the other feature-weighted pixels are respectively computed. Through the computed similarities, a feature-weighted pixel for compensation is selected from the feature-weighted pixels other than the reference pixel. Finally, noise suppression is performed on the reference pixel by using the feature-weighted pixel for compensation.

5 Claims, 11 Drawing Sheets

Set a next selected area

NOISE SUPPRESSION METHOD FOR DIGITAL IMAGE

CROSS-REFERENCE TO RELATED APPLICATIONS

This non-provisional application claims priority under 35 U.S.C. §119(a) on Patent Application No(s). 098131643 filed in Taiwan, R.O.C. on Sep. 18, 2009, the entire contents of which are hereby incorporated by reference.

BACKGROUND OF THE INVENTION

1. Field of Invention

The present invention relates to a method for processing a digital image, and more particularly to a noise suppression method for a digital image.

2. Related Art

Along with the rapid development of digital cameras, demands for digital images are also boosting. The digital camera captures an image frame by using a planar photosensitive element, or retrieves a square area from the image. Once an exposure action is finished, a control circuit transfers charges on a capacitor unit to a next adjacent unit. When reaching the last unit at the edge, the charge signal is transmitted to an amplifier and converted into a potential thereby. The above process is repeated until the whole image frame is converted into potentials, and the potentials are then sampled, digitalized, and stored into a memory.

However, after a long time of exposure of the photosensitive element, fluctuation may occur to surface charges of the photosensitive element. Due to the charge fluctuation, noises are generated in the imaging of the digital image. In addition to the exposure time, the light-receiving capability of the photosensitive element is also enhanced by increasing the gain of the photosensitive element. However, in such a manner, the fluctuation may be more easily resulted to the charges.

The noises are not only generated in hardware processing, but also in software processing. For example, when an edge sharpening process is performed on the digital image, for color pixels originally having non-obvious differences in the digital image, the color gradation between different colors is enhanced due to the sharpening effect. In this manner, particles having different colors may appear in the digital image.

Therefore, in order to improve the quality of the digital image, many camera manufacturers or image processing manufacturers have proposed a variety of denoising methods. In most of the denoising methods, a digital filter technology is generally employed to perform a denoising action. For example, the denoising action may be performed by means of close color correction or blurring. All the above methods can reduce the noises in the digital image, but affect the imaging quality of the whole digital image. For example, in a blurred digital image, although the consistency between the pixels having close colors is enhanced, the original profile borders in the digital image also become fuzzy accordingly.

SUMMARY OF THE INVENTION

Therefore, the present invention is a noise suppression method for a digital image, which utilizes pixels of an adjacent area in the digital image to perform a color correction process on a target pixel.

In order to achieve the above objective, the noise suppression method for a digital image provided in the present invention comprises the following steps. A feature-weighted processing procedure is performed to convert each original pixel in the digital image into a feature-weighted pixel, so as to output a feature-weighted image. According to a position of the target pixel in the digital image, a feature-weighted pixel is selected from a corresponding position in the feature-weighted image as a reference pixel. A similarity computing procedure is performed to generate similarities of the reference pixel relative to the feature-weighted pixels other than the reference pixel. According to the computed similarities, a feature-weighted pixel is selected from the feature-weighted pixels other than the reference pixel as a feature-weighted pixel for compensation. A pixel compensating procedure is performed to compensate an image feature of the target pixel based on the corresponding similarity weighted value according to the original image value of the selected feature-weighted pixel for compensation.

The similarity computing procedure is performed by using Equations 1 and 2, and the pixel compensating procedure is performed by using Equations 3 and 4.

$$Diff(i, j) = \left\| \begin{array}{l} PixelValue(Neighbor_i) - \\ PixelValue(Neighbor_j) \end{array} \right\| \quad \text{Equation 1}$$

$$w(i, j) = f(Diff(i, j)) \quad \text{Equation 2}$$

$$PixelWeightValue(i) = \sum_{j \in R} w(i, j) \times PixelValue(j) \quad \text{Equation 3}$$

$$\sum_{j \in R} w(i, j) = 1 \quad \text{Equation 4}$$

where i represents the target pixel, j represents the original pixel corresponding to the feature-weighted pixel on the periphery of the reference pixel, Diff(i,j) is differences of the reference pixel relative to the other feature-weighted pixels, PixelValue(Neighbor$_i$) is a pixel feature-weighted value of i, PixelValue(Neighbor$_j$) is a pixel feature-weighted value of j, w(i,j) is similarities of the reference pixel relative to the other feature-weighted pixels, f( ) is a conversion function between the differences and the similarities, PixelWeightValue(i) is a pixel value obtained after the pixel compensating procedure is performed on i, PixelValue(j) is a pixel value of j, R represents a size of the digital image, R is M×N, M and N are positive integers greater than or equal to 1, i is an arbitrary positive integer in 1 to M×N, and j is an arbitrary positive integer in 1 to M×N other than i.

In the noise suppression method for a digital image according to the present invention, the pixels having close image features and high similarities are used for compensation, so that the digital image may not be damaged, and a more desirable image quality is achieved.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The present invention provides a noise suppression method for a digital image, and particularly a suppression method for noise pixels. In the method, similarities between each pixel and peripheral pixels thereof in the digital image serve as computing weights of the pixel or a closest specific value is used as a correction reference to correct the color or information of each pixel.

The noise suppression method for a digital image provided by the present invention is applicable to an electronic computing device for performing noise color correction on the digital image input into the electronic computing device. In other words, the noise suppression method for a digital image provided by the present invention may be stored in the form of a software or firmware program in a storage unit (such as a memory or a hard disc) of the electronic computing device, and realized by executing the stored software or firmware program by a processor of the electronic computing device.

Figure 1:
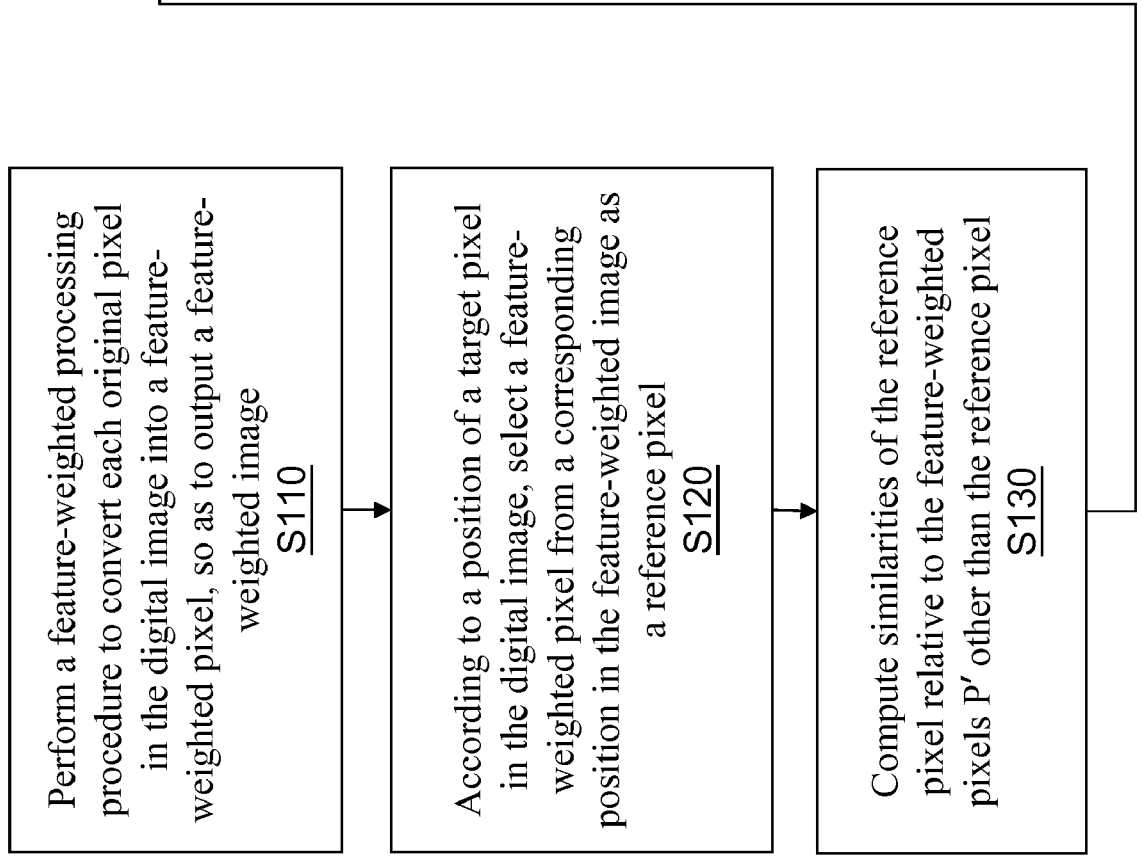
FIG. 1 is a flow chart of a noise suppression method for a digital image according to an embodiment of the present invention.

Referring to FIG. 1, a schematic view of an operating process according to an embodiment of the present invention is shown. The noise suppression method for a digital image comprises the following steps.

Figure 2A:
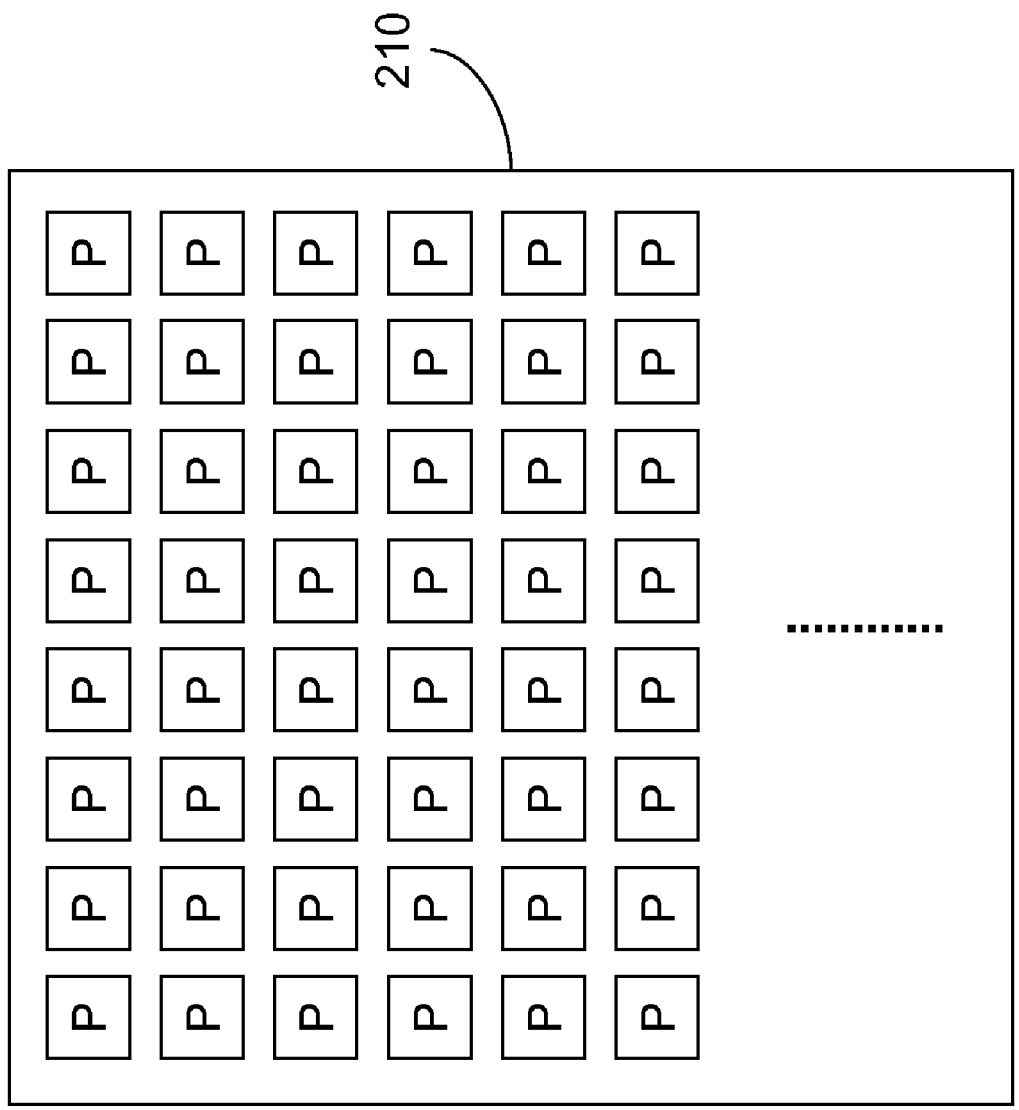
FIG. 2A is a schematic view of a digital image according to the embodiment of the present invention.
Figure 2B:
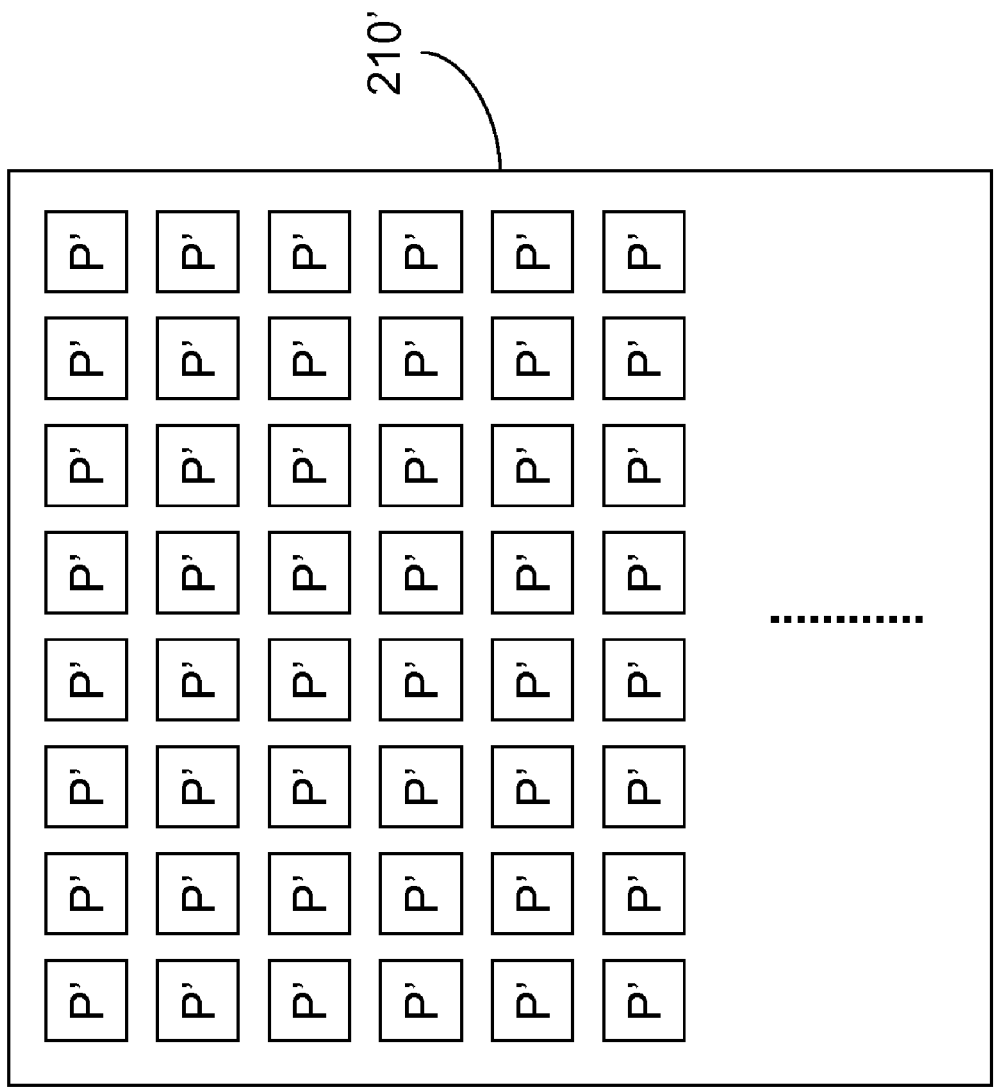
FIG. 2B is a schematic view of a feature-weighted image according to the embodiment of the present invention.

In Step S110, a feature-weighted processing procedure is performed to convert each original pixel P in a digital image 210 into a feature-weighted pixel P', so as to output a feature-weighted image 210', as shown in FIGS. 2A and 2B.

In Step S120, according to a position of a target pixel in the digital image 210, a feature-weighted pixel is selected from a corresponding position in the feature-weighted image 210' as a reference pixel. The target pixel is an arbitrary pixel among all the original pixels P of the digital image 210.

In Step S130, similarities of the reference pixel relative to the feature-weighted pixels P' other than the reference pixel are computed.

In Step S140, the feature-weighted pixel P' having the highest or a relatively higher similarity relative to the reference pixel is selected from the feature-weighted pixels P' as a feature-weighted pixel for compensation. Moreover, the feature-weighted pixel having a similarity relative to the reference pixel larger than a threshold or satisfying predetermined conditions may also be selected as the feature-weighted pixel for compensation. In other words, this step may be preset upon demands into: selecting the feature-weighted pixel P' having the highest similarity relative to the reference pixel, or selecting the feature-weighted pixel P' having a relatively higher similarity relative to the reference pixel, or selecting the feature-weighted pixel P' having a similarity relative to the reference pixel larger than a threshold, or selecting the feature-weighted pixel P' having a similarity relative to the reference pixel satisfying predetermined conditions as the feature-weighted pixel for compensation.

In Step S150, a pixel compensating procedure is performed to compensate an image feature of the target pixel based on the corresponding similarity according to the original pixel P corresponding to the selected feature-weighted pixel for compensation P'.

Figure 3:
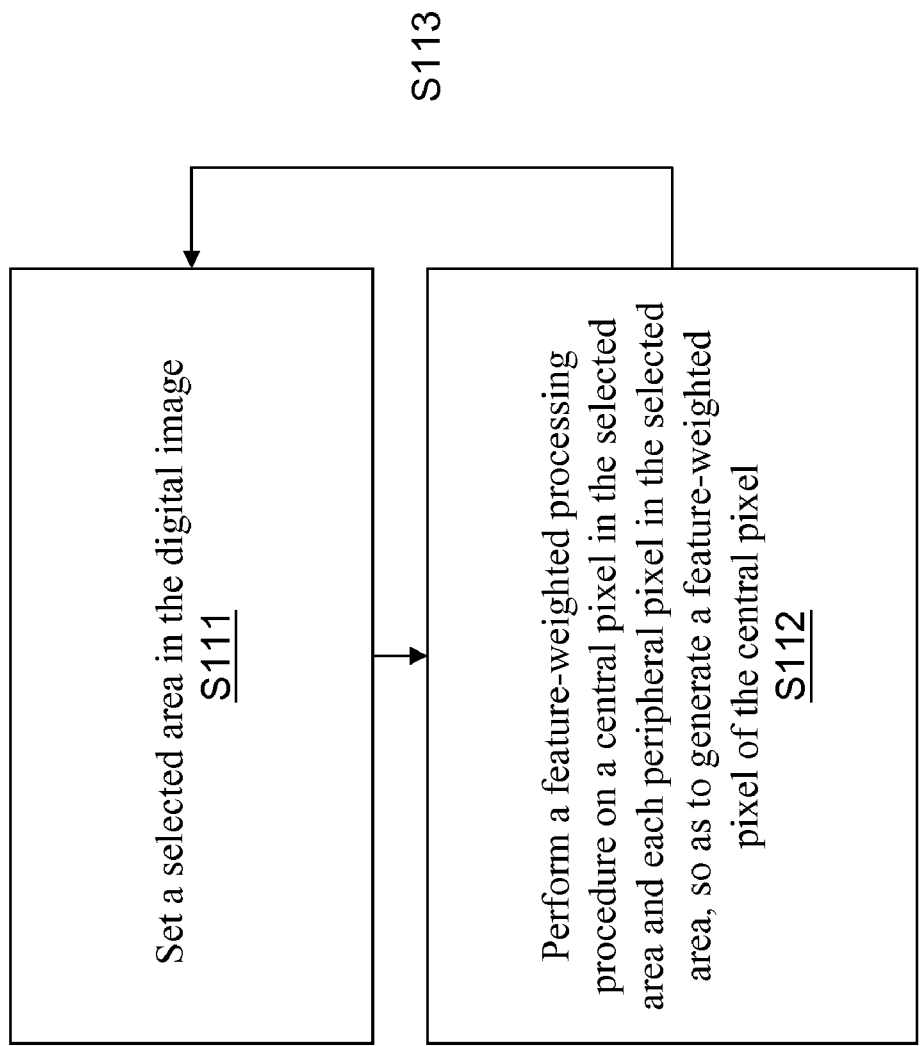
FIG. 3 is a flow chart of a feature-weighted processing procedure according to the embodiment of the present invention.
Figure 4:
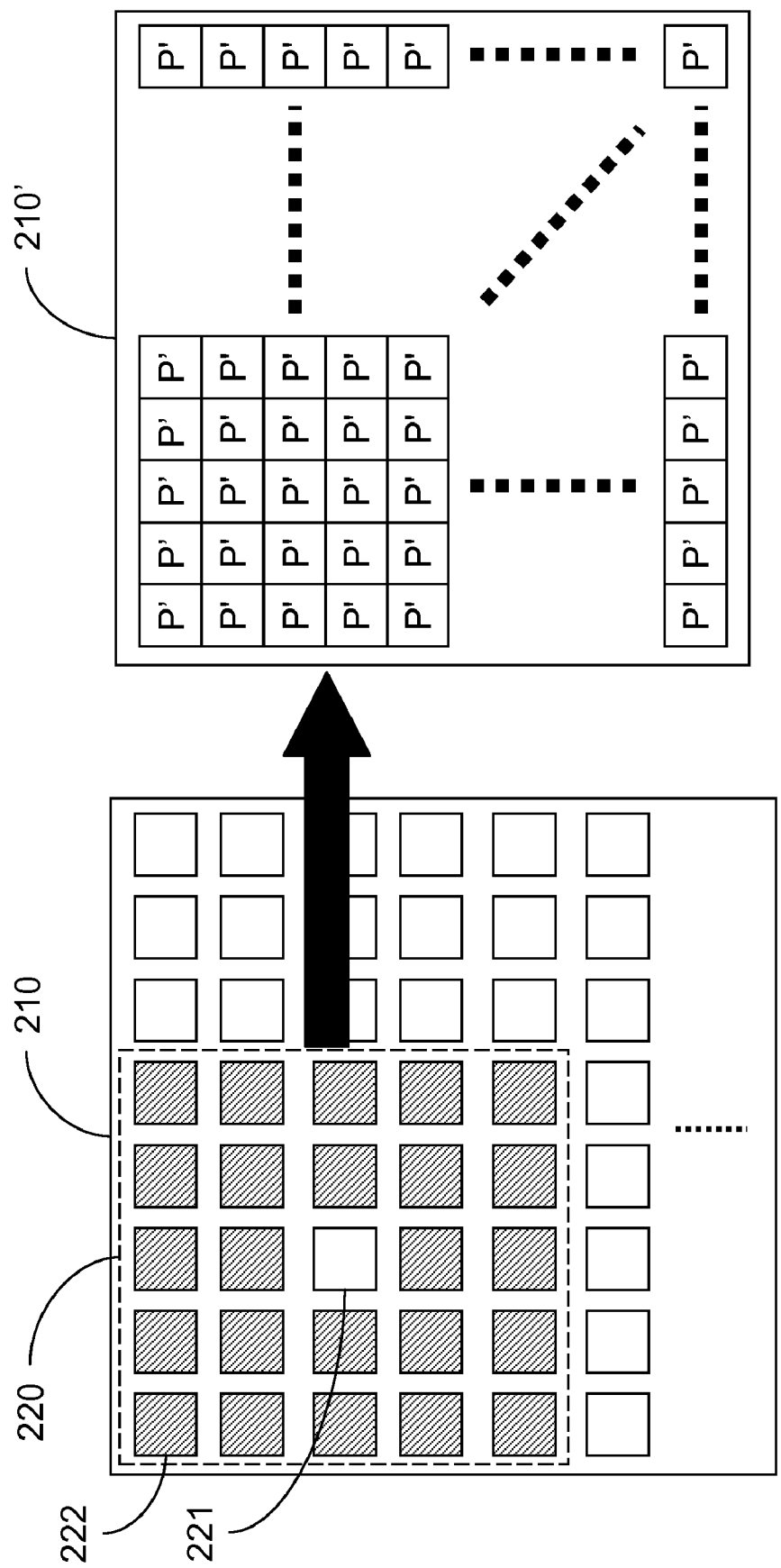
FIG. 4 is a schematic view of converting the digital image into the feature-weighted image according to the embodiment of the present invention.

Referring to FIGS. 3 and 4, the feature-weighted processing procedure in Step S110 further comprises the following steps.

In Step S111, a selected area 220 is set in the digital image 210. The selected area 220 refers to a local image block in the digital image 210, and has a specific size or a single pixel. Here, the selected area 220 is an a×b pixel array, and a, b are positive integers greater than or equal to 1. In addition, a and b may have the same value or different values.

In Step S112, a feature-weighted processing procedure is performed on a central pixel 221 in the selected area 220 and each peripheral pixel 222 in the selected area 220, so as to generate a feature-weighted pixel 221' of the central pixel 221. The central pixel 221 is the original pixel P located at the center of the selected area 220, and the peripheral pixel 222 is the original pixel P located on the periphery of the central pixel 221 in the selected area 220. Then, Steps 111 and 112 are repeatedly performed until each original pixel P in the digital image 210 is converted into the feature-weighted pixel P'.

Figure 5A:
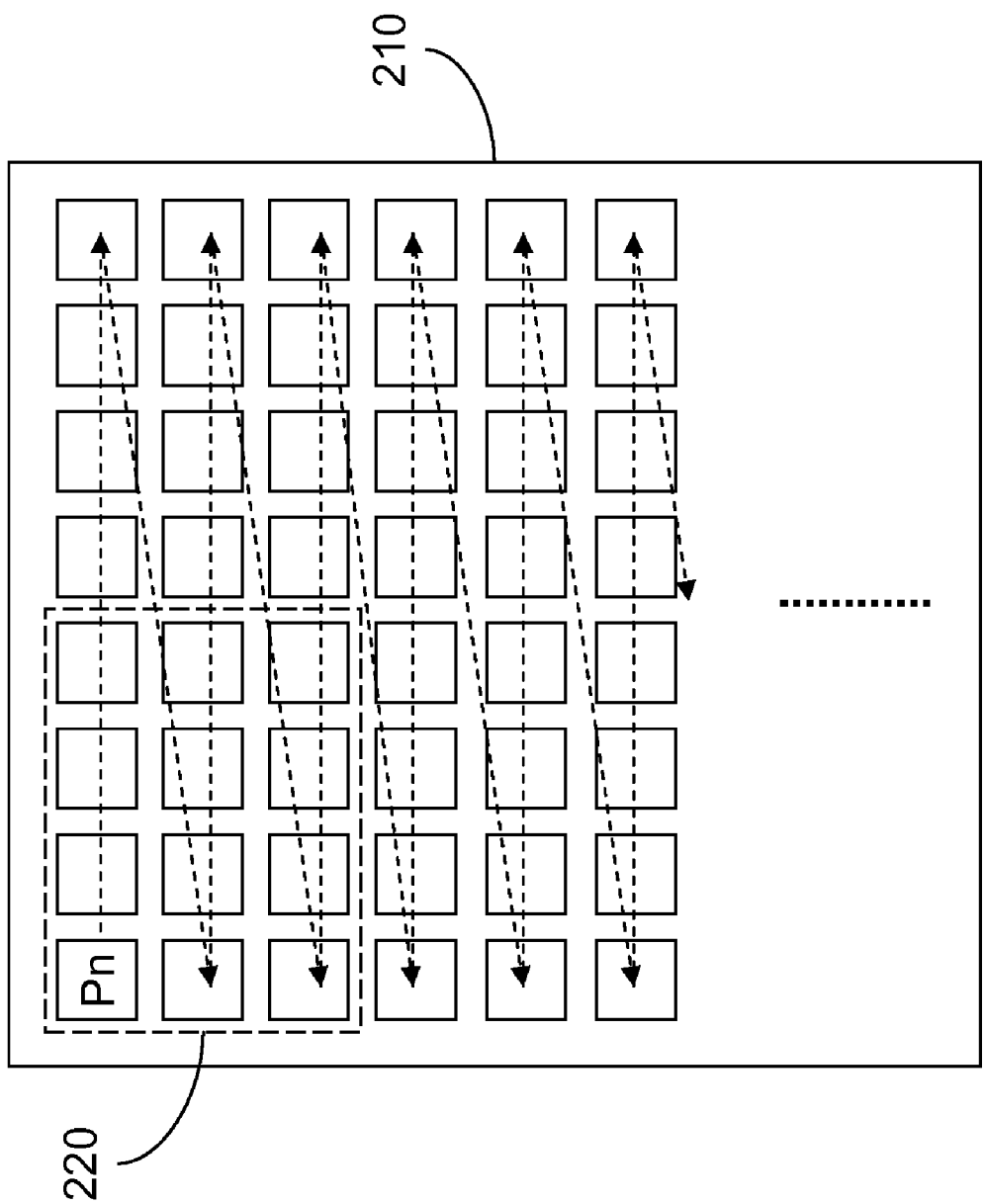
FIG. 5A is a schematic view of a selecting direction of a selected area according to a first embodiment of the present invention.
Figure 5B:
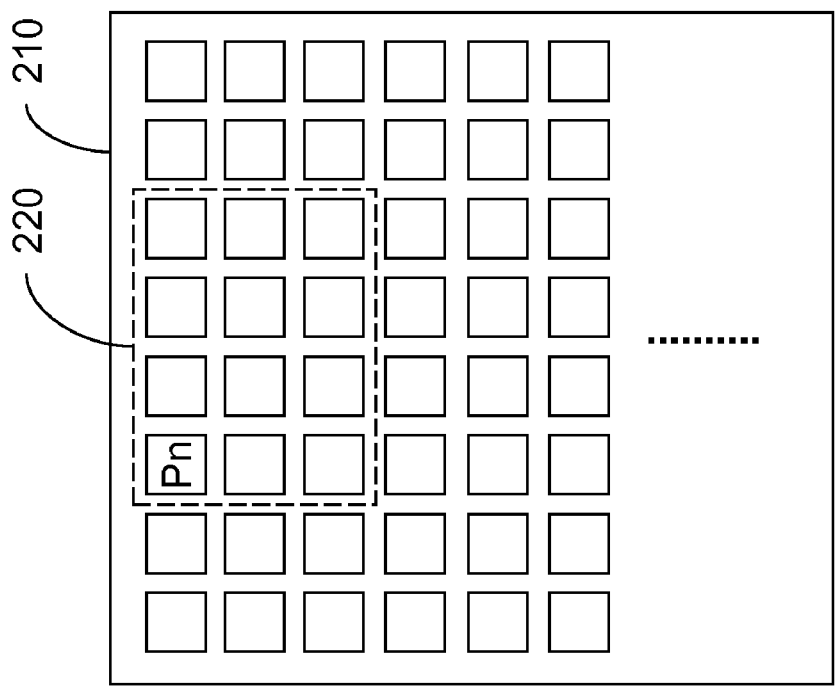
FIG. 5B is a schematic view of a selecting direction of a selected area according to a second embodiment of the present invention.
Figure 5B:
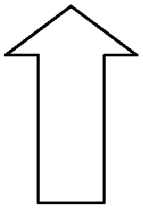
Figure 5B:
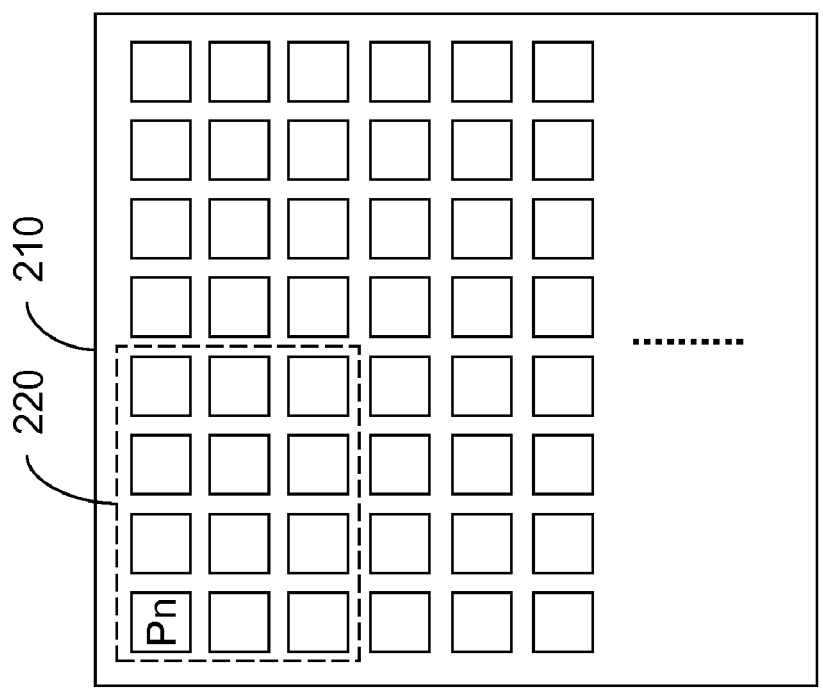
Figure 5C:
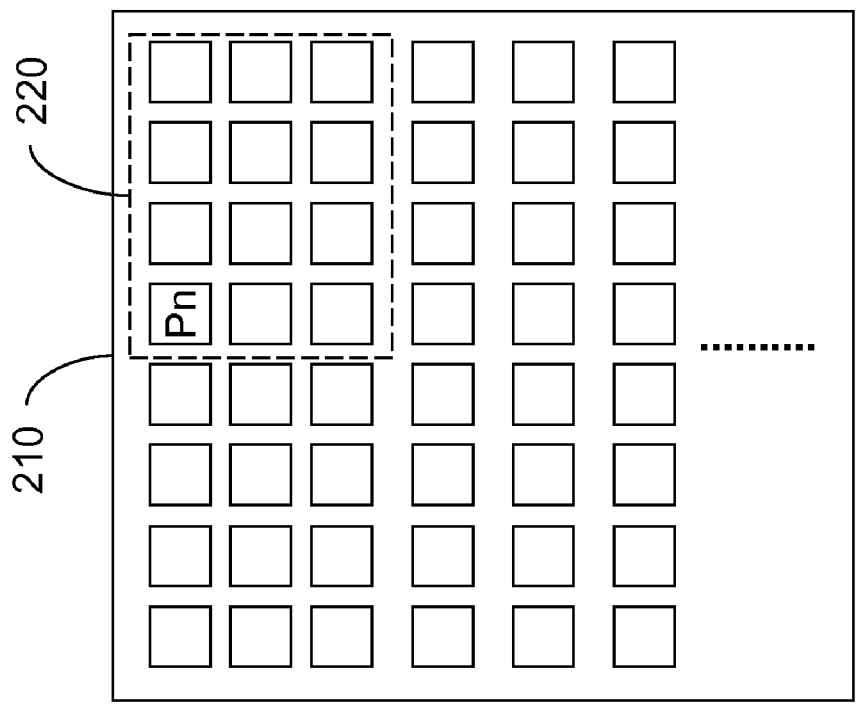
FIG. 5C is a schematic view of a selecting direction of a selected area according to a third embodiment of the present invention.
Figure 5C:
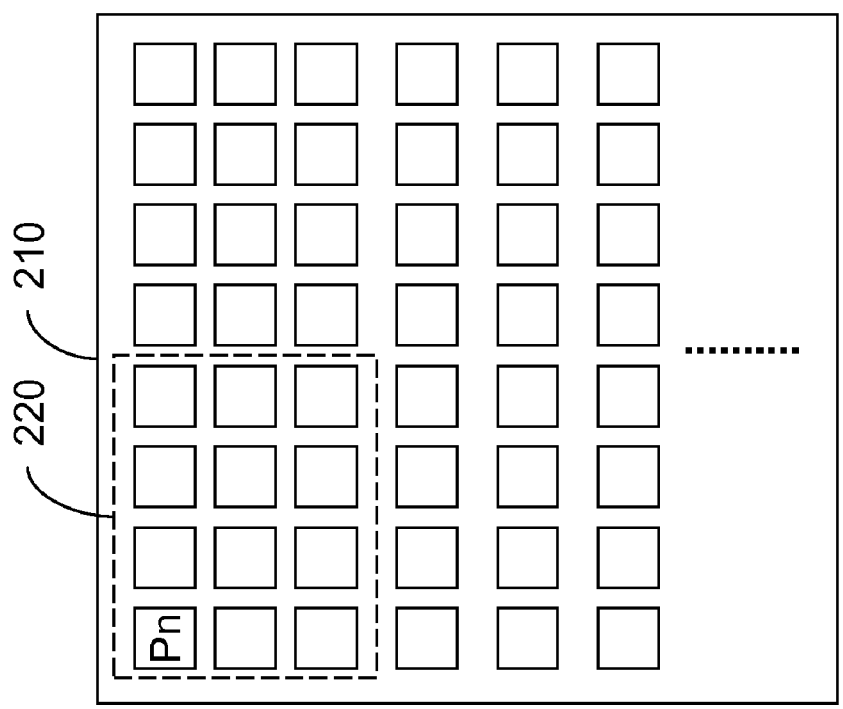

Referring to FIGS. 5A, 5B, and 5C, a selecting sequence of the selected area 220 depends upon a selected positioning pixel Pn. In order words, once the selected area 220 is set, a pixel is selected as the positioning pixel, and then the selected area 220 is formed with the positioning pixel Pn as a reference. The original pixel located at any position (for example, the upper right corner, upper left corner, lower right corner, lower left corner, or the center) of the selected area 220 may be set as the positioning pixel Pn.

In this embodiment, the selected area 220 may be set to select the positioning pixel Pn in a Z-shaped sequence (a direction indicated by a dotted line in FIG. 5A), i.e., to select the positioning pixel Pn in a direction from left to right and from top to bottom. Therefore, the selected area 220 may be set in a sequential and overlapping manner, so as to select each image block of the whole digital image, as shown in FIG. 5B. Definitely, the positioning pixel Pn and the selected area 220 may also be selected according to different directional sequences. In addition, the selected area 220 may also be set in a non-overlapping manner, as shown in FIG. 5C.

The use of the selected area 220 may cause that an edge portion of the digital image 210 fails to generate the corresponding feature-weighted pixel P', so that the size of the weighted feature-weighted image 210' is slightly smaller than that of the digital image 210. For example, if the digital image 210 is an image of 100*100 (pixel array), and the selected area 220 is a 3*3 pixel array, the output feature-weighted image 210' is a 98*98 pixel array.

Therefore, the edge portion of the feature-weighted image 210' may be compensated with the edge of the digital image 210, so as to make the size of the feature-weighted image 210' equal to that of the digital image 210.

Alternatively, the edge portion of the feature-weighted image 210' is not compensated, but instead, a corresponding relation between the feature-weighted image 210' and the digital image 210 is adjusted. For example, the feature-weighted pixel at a position (1,1) on the feature-weighted image 210' is corresponding to the original pixel at a position (3,3) on the digital image 210. Likewise, for the other digital images 210 and selected areas 220 of different sizes, the pixel correspondence relation between the feature-weighted image 210' and the digital image 210 may be established in the same manner.

Further referring to FIG. 4, a schematic view of the feature-weighted pixel P' corresponding to each original pixel P in the selected area 220 is shown. For the convenience of illustration, the selected positioning pixel in the digital image 210 is defined as the central pixel 221 herein. After the central pixel 221 is selected, an a×b pixel array is set on the periphery of the central pixel 221 with the central pixel 221 as the center. Here, the a×b pixel array is defined as the selected area 220. The central pixel 221 performs the feature-weighted processing procedure on the other original pixels in the selected area 220 (i.e., the peripheral pixels 222, such as the original pixels filled with slashes in FIG. 4) respectively, thereby generating the feature-weighted pixel 221' corresponding to the central pixel 221.

For example, if the selected area 220 is a 5*5 pixel array, the original pixel located at a pixel position (3, 3) may be selected as the central pixel 221. The position of the central pixel 221 may be selected according to different implementation aspects, which will not be listed herein.

Afterward, with reference to the following Equations 1 to 4, the similarities are computed for the pixel values of the pixels.

$$\text{Diff}(i, j) = \left\| \begin{array}{c} PixelValue(Neighbor_i) - \\ PixelValue(Neighbor_j) \end{array} \right\| \quad \text{Equation 1}$$

$$w(i, j) = f(\text{Diff}(i, j)) \quad \text{Equation 2}$$

$$PixelWeightValue(i) = \sum_{j \in R} w(i, j) \times PixelValue(j) \quad \text{Equation 3}$$

$$\sum_{j \in R} w(i, j) = 1 \quad \text{Equation 4}$$

where, i represents the target pixel (i.e., an $i^{th}$ original pixel), and j represents the reference pixel (i.e., a $i^{th}$ original pixel). The reference pixel is the original pixel corresponding to the feature-weighted pixel used for reference on the periphery of the reference pixel. If the digital image 210 is an M×N pixel array, M and N are positive integers greater than or equal to 1, i is an arbitrary positive integer in 1 to M×N, and j is an arbitrary positive integer in 1 to M×N other than i.

PixelValue(Neighbor$_i$) is a pixel feature-weighted value of the target pixel i, i.e., the reference pixel.

PixelValue(Neighbor$_j$) is a pixel feature-weighted value of the reference pixel j in the selected area 220 where the target pixel i is located, i.e., the feature-weighted pixel other than the reference pixel.

f( ) is a conversion function between the difference and the similarity weight of the feature-weighted pixel.

Diff(i,j) is a difference of the target pixel i relative to the feature-weighted value of the reference pixel j, i.e., the differences of the reference pixel relative to the other feature-weighted pixels.

PixelWeightValue(i) is a corrected pixel value output after a final process on the target pixel i, i.e., the pixel value obtained after the image feature compensation performed on the target pixel i.

PixelValue(j) is an original pixel value of the reference pixel j before processing.

w(i,j) is a similarity weight of the target pixel i relative to the reference pixel j, i.e., the similarities of the reference pixel relative to the feature-weighted pixels other than the reference pixel.

R represents a size of the digital image.

The present invention can not only compute the similarity of the pixel color (pixel feature), but also compute the similarity according to different image feature values. For example, the image feature may be, but not limited to, color space, image material, image texture, and/or image brightness value. Taking the color space as an example, the similarity weight w(i,j) may be modified into the following Equation 5.

$$\text{Diff}(i,j) = \|ColorIndexValue(Neighbor_i) - ColorIndexValue(Neighbor_j)\| \quad \text{Equation 5}$$

ColorIndexValue(Neighbor$_i$) is a feature-weighted value of the color space of the target pixel i, i.e., the reference pixel.

PixelValue(Neighbor$_j$) is a feature-weighted value of the color space of the reference pixel j in the selected area 220 where the target pixel i is located.

According to a relation of the image features (or a combination thereof), a similarity degree between the adjacent pixels is further computed. For different image features, the visual perception of the human eye does not obtain a linear relation by directly adding up the pixels. For example, in the selected area 220 having a complicated texture, the similarity between every two pixels is reduced due to the texture.

After the feature-weighted pixels for all the pixels in the digital image 210 are accomplished, a feature-weighted image is generated according to the generating sequence of the feature-weighted pixels. Then, the feature-weighted pixels are selected one by one from the feature-weighted image for computing the similarity. Herein, the selected feature-weighted pixel is defined as the reference pixel (i.e., the feature-weighted pixel located at the corresponding position of the target pixel). The similarity of the image feature of the target pixel relative to the reference pixel is obtained so as to generate the similarity weight w(i,j). The feature-weighted pixel having the highest or a relatively higher similarity relative to the reference pixel is selected from the feature-weighted pixels P', and is defined as a feature-weighted pixel for compensation. According to the original pixel at the position where the feature-weighted pixel for compensation is located, the pixel compensating procedure is performed on the target pixel, and a new target pixel after the compensation is output.

The pixel compensating procedure may be performed, but not limited to, in the manners such as substituting or averaging of the pixel values. Taking the averaging manner as an example, the value of the target pixel and the weighted value are averaged to output a new corrected target pixel. Meanwhile, the similarity weight is computed on the pixel having the highest similarity or the pixel having a relatively higher similarity under a certain condition or all the pixels in all the selected areas, depending upon different requirements and application scenarios.

In this implementation aspect, the similarity between every two pixels in the digital image is computed. In order to clearly describe the operating process of the present invention, a face image is taken as an example to illustrate this embodiment.

Figure 6A:
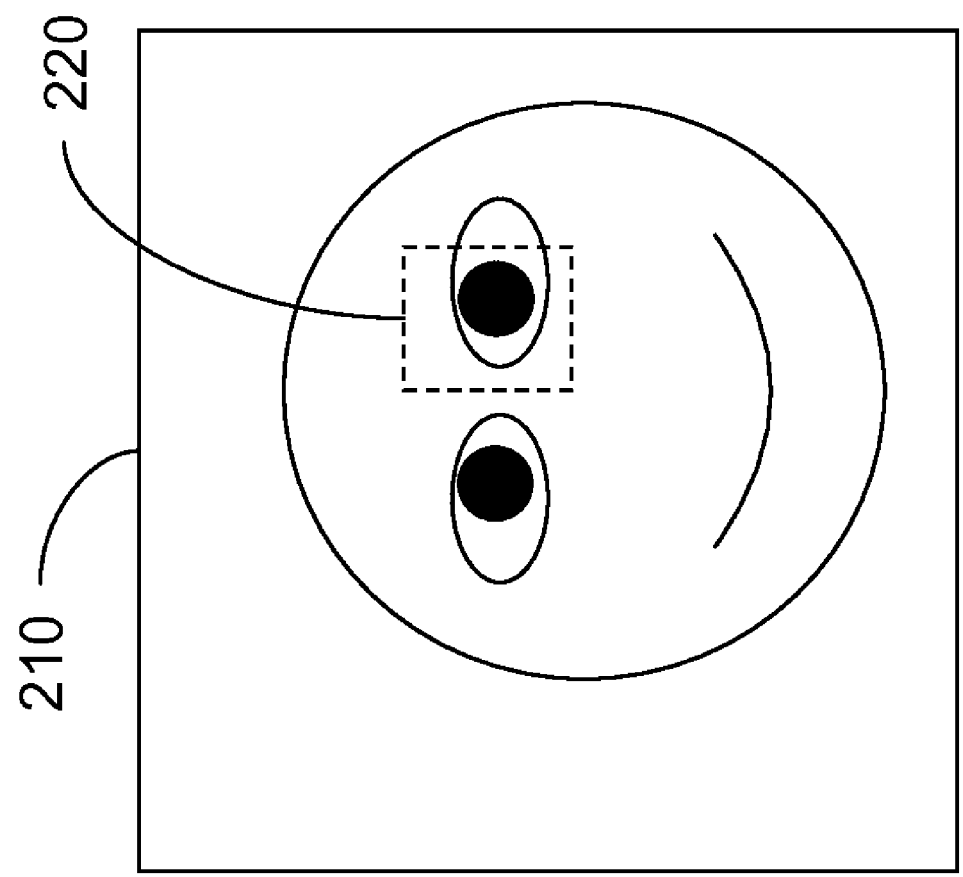
FIG. 6A is a schematic view of a digital image according to another embodiment of the present invention.
Figure 6B:
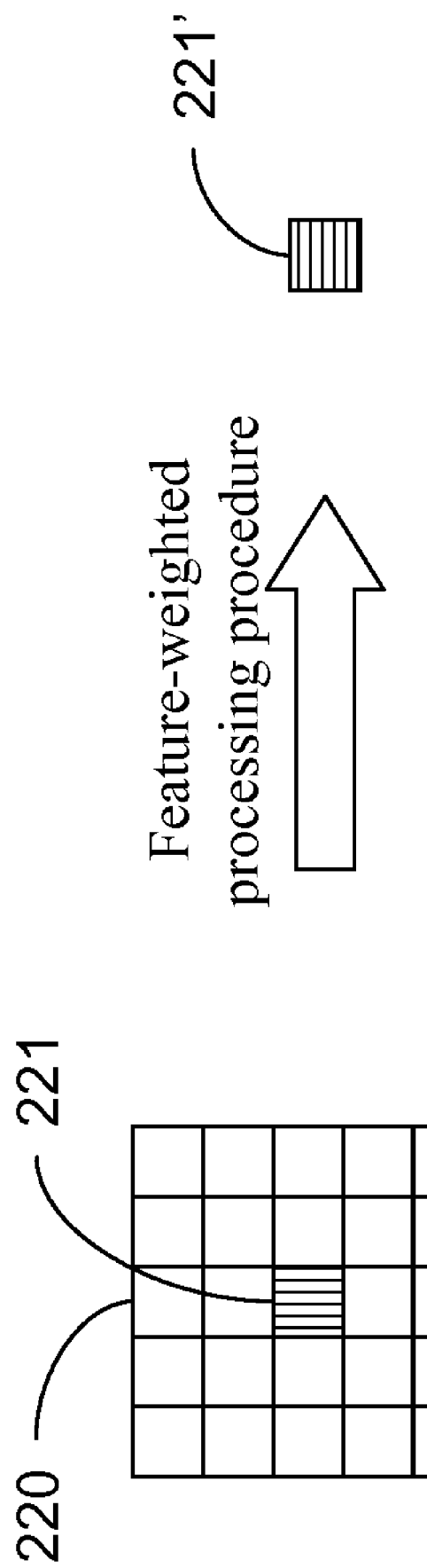
FIG. 6B is a schematic view of a feature-weighted processing procedure corresponding to FIG. 6A according to the present invention.

Firstly, an original pixel is selected from the digital image 210 and a corresponding selected area 220 is set, as shown in FIG. 6A. It is assumed that the selected area 220 is in a size of a 5*5 pixel array, and the central pixel 221 is a pixel at the position (3,3) in the selected area 220. Afterwards, a feature-weighted processing procedure is performed on the central pixel 221 by using the pixels in the selected area 220, and a corresponding feature-weighted pixel 221' is generated, as shown in FIG. 6B. In other words, the selected area 220 is utilized to generate the feature-weighted value of the central pixel 221. The above process is repeatedly performed on the digital image, so as to generate the feature-weighted pixel for each original pixel in the digital image 210.

Figure 6C:
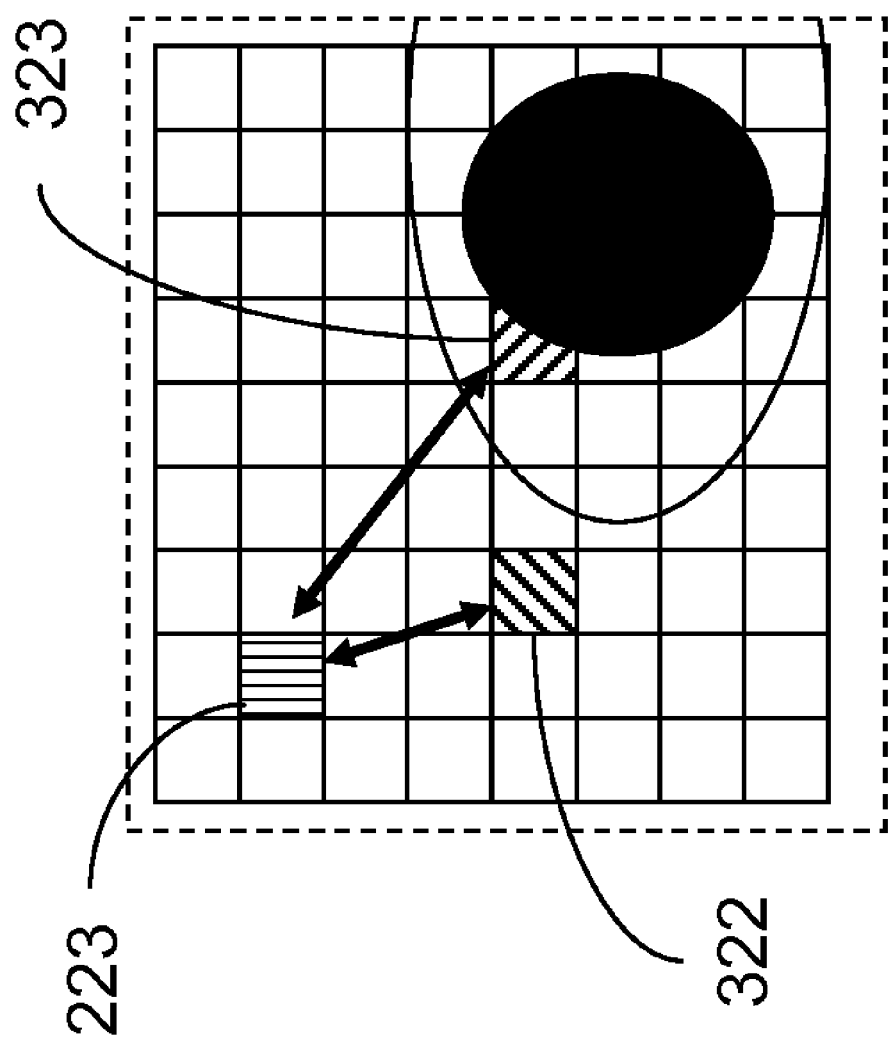
FIG. 6C is a schematic view of a similarity computing procedure corresponding to FIG. 6A according to the present invention.

FIG. 6C shows a portion of the feature-weighted image 210'. A feature-weighted pixel is selected from FIG. 6C, and defined as a reference pixel 223. Moreover, a comparison range is set, and similarities between the reference pixel 223 and the other feature-weighted pixels in the comparison range are respectively computed. The size of the comparison range may be set consistent with the size of the selected area 220, or set with different limitations. For example, in a small digital image 210, the comparison range is set as the whole digital image 210; while in a large digital image 210, the comparison range is set as a pixel array of a large range, so as to accelerate the computation thereof.

In this embodiment, the similarities of the reference pixel 223 relative to a second feature-weighted pixel 322 and a third feature-weighted pixel 323 are respectively computed. In other implementation aspects, an appropriate number of feature-weighted pixels may be selected for similarity comparison according to different settings.

As for the color difference, it can be seen from the feature-weighted image 210' in FIG. 6C that, the difference between the reference pixel 223 and the second feature-weighted pixel 322 is smaller than the difference between the reference pixel 223 and the third feature-weighted pixel 323. In other words, the second feature-weighted pixel 322 is closer to the reference pixel 223 than the third feature-weighted pixel 323. Therefore, if the reference pixel 223 is a noise pixel, the second feature-weighted pixel 322 is preferentially selected for compensation.

In the present invention, the digital image 210 is divided into a plurality of selected areas 220, and the feature-weighted pixel P' representing each selected area 220 is generated from each selected area 220. A weighted pixel is selected as the reference pixel 223, and the similarities between the reference pixel and the other feature-weighted images are computed. Then, a compensation correction weight of each feature-weighted pixel P' for correcting the reference pixel 223 is computed thereby. Finally, the target pixel value is corrected with the original pixel values of the feature-weighted pixels P'. As the present invention compensates the target pixel by using the adjacent pixels having high similarities, the original digital image may not be damaged, and a more desirable image quality is achieved.

What is claimed is:

1. A noise suppression method for a digital image, utilizing an adjacent area of a target pixel in the digital image to conduct a denoising process on the target pixel, the noise suppression method comprising:
performing a feature-weighted processing procedure to convert each original pixel in the digital image into a feature-weighted pixel, so as to output a feature-weighted image;
according to a position of the target pixel in the digital image, selecting a feature-weighted pixel from a corresponding position in the feature-weighted image as a reference pixel, wherein the target pixel is an arbitrary pixel among all the original pixels of the digital image;
performing a similarity computing procedure to generate similarities of the reference pixel relative to the feature-weighted pixels other than the reference pixel;
according to the similarities of the reference pixel relative to the other feature-weighted pixels, selecting a feature-weighted pixel for compensation from the other feature-weighted pixels; and
performing a pixel compensating procedure to compensate an image feature of the target pixel based on the corresponding similarity according to the original pixel where the feature-weighted pixel for compensation is located.

2. The noise suppression method for the digital image according to claim 1, wherein the feature-weighted processing procedure comprises:
setting a selected area in the digital image;
performing the feature-weighted processing procedure on a central pixel in the selected area and each peripheral pixel in the selected area, so as to generate the feature-weighted pixel corresponding to the central pixel, wherein the central pixel is the original pixel located at the center of the selected area, and the peripheral pixel is the original pixel located on the periphery of the central pixel in the selected area; and
repeatedly performing the step of setting the selected area and the step of generating the feature-weighted pixel corresponding to the central pixel until each of the original pixels in the digital image is converted into the feature-weighted pixel.

3. The noise suppression method for the digital image according to claim 2, wherein the selected area is an a×b pixel array, and a, b are positive integers greater than or equal to 1.

4. The noise suppression method for the digital image according to claim 1, wherein the similarity computing procedure is performed by using Equations 1 and 2, and the pixel compensating procedure is performed by using Equations 3 and 4, where i represents the target pixel, j represents the original pixel corresponding to the feature-weighted pixel on the periphery of the reference pixel, Diff(i,j) is differences of the reference pixel relative to the other feature-weighted pixels, PixelValue(Neighbor$_i$) is a pixel feature-weighted value of i, PixelValue(Neighbor$_j$) is a pixel feature-weighted value of j, w(i,j) is similarities of the reference pixel relative to the other feature-weighted pixels, f( ) is a conversion function between the differences and the similarities, PixelWeightValue(i) is a pixel value obtained after the pixel compensating procedure is performed on i, PixelValue(j) is a pixel value of j, R represents a size of the digital image, R is M×N, M and N are positive integers greater than or equal to 1, i is an arbitrary positive integer in 1 to M×N, and j is an arbitrary positive integer in 1 to M×N other than i;

$$Diff(i, j) = \left\| \begin{array}{c} PixelValue(Neighbor_i) - \\ PixelValue(Neighbor_j) \end{array} \right\| \quad \text{Equation 1}$$

$$w(i, j) = f(Diff(i, j)) \quad \text{Equation 2}$$

$$PixelWeightValue(i) = \sum_{j \in R} w(i, j) \times PixelValue(j) \quad \text{Equation 3}$$

$$\sum_{j \in R} w(i, j) = 1 \quad \text{Equation 4}$$

5. The noise suppression method for the digital image according to claim 1, wherein the image feature is a pixel color, a color space, a texture, or a brightness value.

* * * * *